(12) United States Patent
Bucklin

(10) Patent No.: US 9,463,823 B2
(45) Date of Patent: Oct. 11, 2016

(54) APPARATUS FOR TRANSPORTING A USER ACROSS A SURFACE

(71) Applicant: Christopher Bucklin, Yorba Linda, CA (US)

(72) Inventor: Christopher Bucklin, Yorba Linda, CA (US)

( * ) Notice: Subject to any disclaimer, the term of this patent is extended or adjusted under 35 U.S.C. 154(b) by 0 days.

(21) Appl. No.: 14/285,520

(22) Filed: May 22, 2014

(65) Prior Publication Data

US 2015/0336600 A1    Nov. 26, 2015

(51) Int. Cl.
*B62B 13/02* (2006.01)
*B62B 17/06* (2006.01)
*B62B 15/00* (2006.01)

(52) U.S. Cl.
CPC .............. *B62B 13/02* (2013.01); *B62B 15/00* (2013.01); *B62B 17/06* (2013.01); *B62B 17/061* (2013.01); *B62B 17/067* (2013.01)

(58) Field of Classification Search
CPC ....... B62B 13/00; B62B 13/02; B62B 13/06; B62B 13/125; B62B 15/006; B62B 15/007; B62B 17/02; B62B 17/061; B62B 17/067; B62B 17/068
See application file for complete search history.

(56) References Cited

U.S. PATENT DOCUMENTS

| 2,139,513 | A | * | 12/1938 | Nelson et al. | 280/18 |
| 3,693,849 | A | * | 9/1972 | Knabenbauer | 224/153 |
| 3,782,744 | A | * | 1/1974 | Milovich et al. | 280/18 |
| 3,921,239 | A | * | 11/1975 | Sovia et al. | 441/65 |
| 3,952,354 | A | * | 4/1976 | Turner | 441/65 |
| 4,044,415 | A | * | 8/1977 | Wood | B63B 35/7933 267/69 |
| 4,347,635 | A | * | 9/1982 | Eisenhauer | 441/40 |
| 4,561,664 | A | | 12/1985 | Cashmere | |
| 4,603,870 | A | | 8/1986 | Monreal | |
| 4,669,992 | A | * | 6/1987 | Morris | 441/65 |
| 5,941,540 | A | * | 8/1999 | O'Haire | 280/18 |
| 6,575,479 | B2 | | 6/2003 | Combs | |
| 8,075,014 | B2 | * | 12/2011 | Phibbs | A63C 5/048 280/608 |

* cited by examiner

*Primary Examiner* — Frank Vanaman
(74) *Attorney, Agent, or Firm* — Ariel S. Bentolila; Bay Area IP, LLC.

(57) ABSTRACT

An apparatus comprising a device being configured for transporting a user across a surface. The device comprises at least two side portions, a front portion, a back portion and a bottom portion. Each of the side portions comprises a plurality of raised edges along lengths of bottoms of the side portions from the front portion to the back portion. The plurality of raised edges are configured for engaging the surface to affect the transporting. A pair of handles are joined to the device. Each of the handles are positioned above a top of the device, along the side portions, and extending from the front portion to the back portion. The handles are configured for grasping by the user to control the engaging of the plurality of raised edges during the transporting.

14 Claims, 4 Drawing Sheets

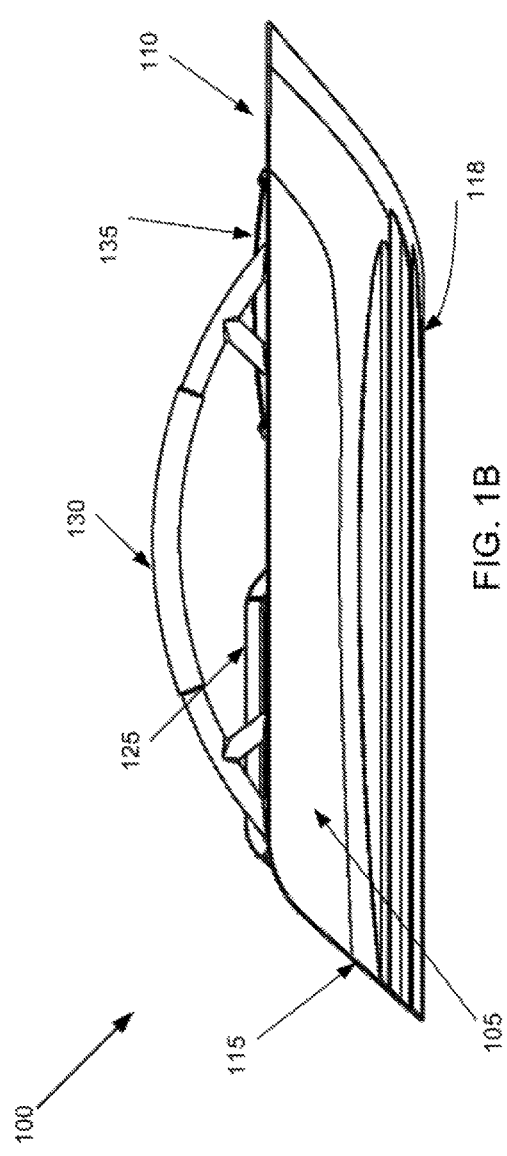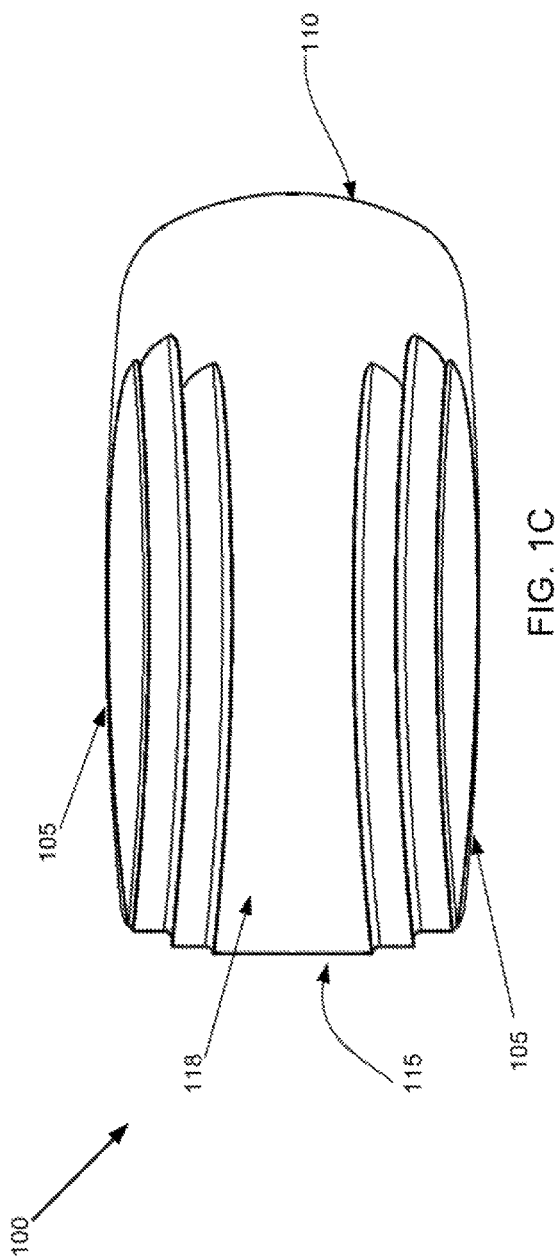

APPARATUS FOR TRANSPORTING A USER ACROSS A SURFACE

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to transport vehicles. More particularly, the invention relates to transport vehicles designed to slide on downward slopes.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

In many instances, people may seek different methods for traveling across surfaces, whether for fun, convenience, efficiency, etc. Some currently available solutions may provide means for devices which a user may sit or kneel upon. However, these solutions may be impractical to use based on size, weight, shape, etc. Moreover, these available solutions may not have means sufficient to provide a user control of the device.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. One such aspect of the prior art shows a hand-toboggan to accommodate a seated or kneeling rider and having a bottom surface with a longitudinally extending medial portion and two opposite flanks upwardly and outwardly inclined from the medial portion, a pair of parallel longitudinally extending ribs bordering the medial portion, and a plurality of parallel inwardly curving ribs on each of said flanks to enable the rider to turn the toboggan in whichever direction the rider should lean. By way of educational background, another aspect of the prior art generally useful to be aware of teaches of a recreational lightweight snow sled of molded plastic sheeting 4' to 5' long and 15" to 24" wide with a contoured bottom or bed to accommodate the user in different positions, primarily kneeling and sitting. Yet another such aspect of the prior art discloses a three-runner sled including a single steerable front runner and two directionally fixed rear runners extending from a frame. However, these solutions may not provide a device which may provide a high degree of control while also providing a lightweight design which may be suitable for use in a variety of situations. A solution which did so would be desirable.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is an illustration of an exemplary device for carrying people and/or objects across various surfaces, in which FIG. 1B is a side view, and FIG. 1C is a bottom view, in accordance with an embodiment of the present invention; and FIG. 2 is an illustration of a cross-section view of an exemplary device 100 having variable amount of edges, in which

Figure 1A:
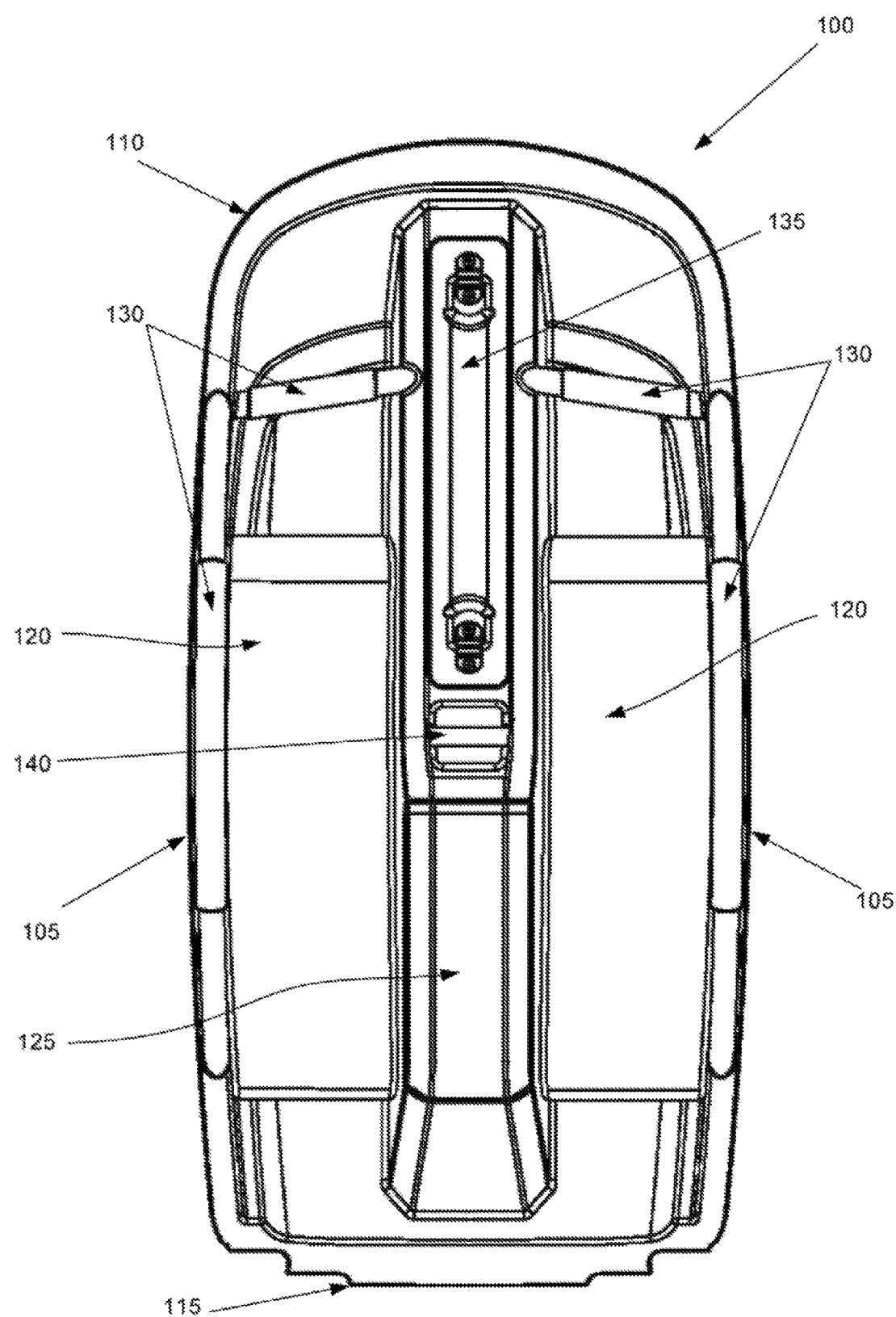
FIG. 1A is a top view.

Unless otherwise indicated, illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicant hereby gives notice that new claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," does not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

As is well known to those skilled in the art, many careful considerations and compromises typically must be made when designing for the optimal manufacture of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Some embodiments of the present invention may be suitable for sliding across various surfaces, including, without limitation, snow, ice, water, mud, sand, etc. Some of these embodiments may be suitable for carrying people and/or various objects.

FIG. 1 is an illustration of an exemplary device for carrying people and/or objects across various surfaces, in which FIG. 1A is a top view, FIG. 1B is a side view, and FIG. 1C is a bottom view, in accordance with an embodiment of the present invention. In the present embodiment, a device 100 may have two side portions 105, a front portion 110, a back portion 115, and a bottom portion 118. In some alternative embodiments, device 100 may have more than two side portions 105. In another alternative embodiment, device 100 may be single-sided, having, without limitation, a circular, oval-shaped, or free-form shape. In the present embodiment, device 100 may have one or more padded areas 120. In some embodiments, padded areas 120 may be suitable for receiving various user body parts, including, without limitation, knees, shins, insteps, feet, buttocks, and back. In a non-limiting example, a user may rest in a kneeling position on device 100 with padded areas 120 extending to comfortably support user's knees, shins and/or insteps. In alternative embodiments, padded areas 120 may be suitable for protectively supporting various objects which may rest on device 100. In the present embodiment, device 100 may have a seat 125. In some embodiments, seat 125 may be padded. In some embodiments, seat 125 may be hollow. In some embodiments, seat 125 may be filled with materials such as, but not limited to, wood, plastic or solid foam. In at least one embodiment, seat 125 may be raised to effectively receive people and/or objects. In a non-limiting example, a seat 125 may be suitable for receiving a user's buttocks and/or back while user's knees, shins, and/or insteps rest on padded areas 120. In some embodiments, padded areas 120 may have varying thickness. In a non-limiting example, thickness of padded areas 120 may vary from approximately 0.5" to 6". In the present non-limiting example, padded areas 120 may be thickest where user's instep may rest and thinnest where user's knees may rest and where padded areas 120 meet seat 125. In some embodiments, padded areas 120 may be composed of, without limitation, open padding or closed-cell using waterproof upholstery coverings. In the present embodiment, device 100 may have handles 130. In some embodiments, handles 130 may be suitable for providing stability and/or control to users. In a non-limiting example, a user may hold handles 130 while on device 100. In another non-limiting example, a user may use one or more hand grips 130 while on device 100. In another non-limiting example, a user may use one or more pairs of hand grips while on device 100. In another non-limiting example, a user may tie ropes to handles 130 to secure an object on device 100. In some embodiments, handles 130 may be any suitable size and/or may be composed of any suitable materials. In a non-limiting example, handles 130 may be approximately 1" in diameter. In another non-limiting example, suitable materials for handles 130 may include, without limitation, steel, aluminum, plastic, acrylic, fiberglass infused with epoxy, carbon fiber, etc. In some embodiments, handles 130 may be covered by any suitable material to provide a grip. In a non-limiting example, handles 130 may be covered by a rubber-like material. In the present embodiment, device 100 may have one or more straps 135. In some embodiments, one or more straps 135 may be suitable for receiving a user's arm or an object such as, without limitation, a pole. In a non-limiting example, a user may either grip one or more straps 135 or slide one's arm through one or more straps 135 to allow user to easily carry device 100 onto a chairlift or similar ascension device while having one arm free to grab a chairlift rail or other handhold. In the present non-limiting example, to exit the chairlift or similar ascension device, user may release its grip of strap(s) 135 or remove user's arm from strap(s) 135, as the case may be, and grip both handles 130, then step off the chairlift or ascension device, kneel on padded areas 120, and slide down the exiting slope. In some embodiments, one or more straps 135 may be padded. In many embodiments, one or more straps 135 may be adjustable to create a larger or smaller area which a user's arm or an object may pass through. In a non-limiting example, one or more straps 135 may be adjusted to create an area large enough that a user may pass one or both arms through one or more straps and wear device 100 like a backpack. In the present embodiment, device 100 may have a raised bar 140. In a non-limiting example, suitable materials for raised bar 140 may include, without limitation, steel, aluminum, plastic or carbon fiber. In some embodiments, bar 140 may be suitable for securing a tether, pull rope or other object. In a non-limiting example, a user may attach one end of a tether to user and another end to bar 140 to prevent device 100 from sliding or being moved away from user. In another non-limiting example, user may attach one end of a pull rope to bar 140 to allow a user to more easily pull or drag device 100 across various surfaces. In another non-limiting example, user may secure an anti-theft device to bar 140. As a non-limiting example, such anti-theft device may implement a cable or chain made of steel or other material not easily cut, broken or torn that is wrapped around, between or through a fixed, secure object (e.g., a mature tree, a building fixture, a bike/ski/snowboard rack, etc.) and connected by a locking mechanism to bar 140. In another non-limiting example, bar 140 may be secured to a rack of an automobile.

Figure 2A:
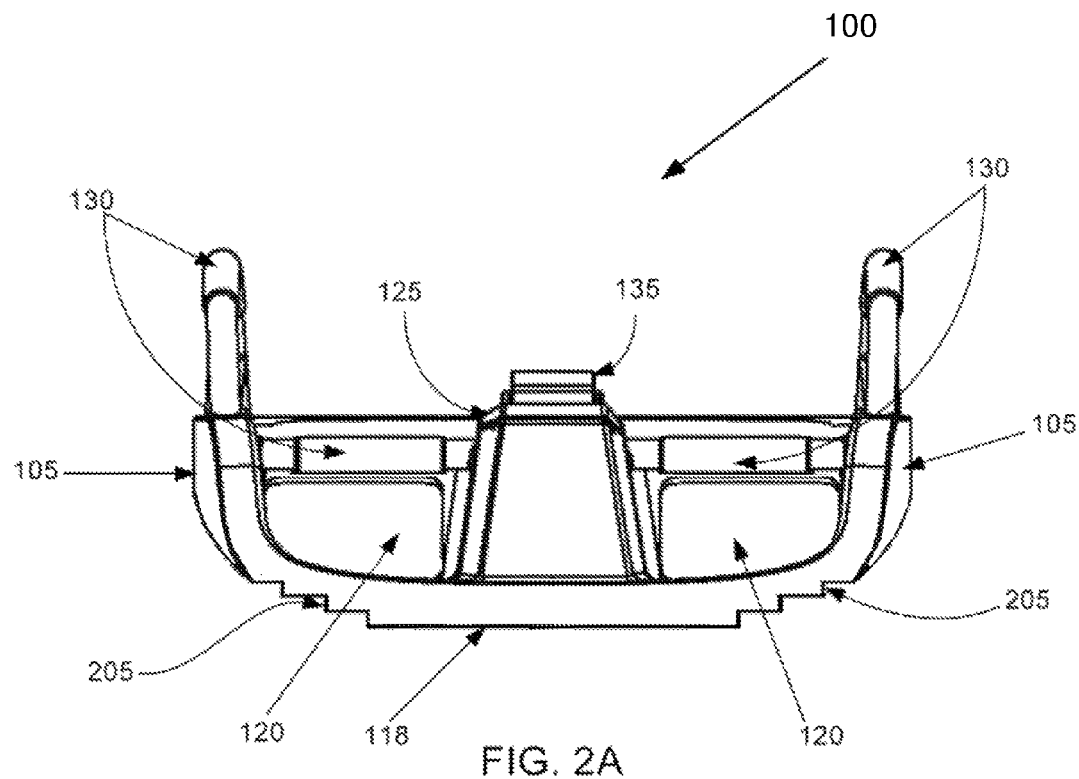
FIG. 2A is a device 100 having 4 edges per side.
Figure 2B:
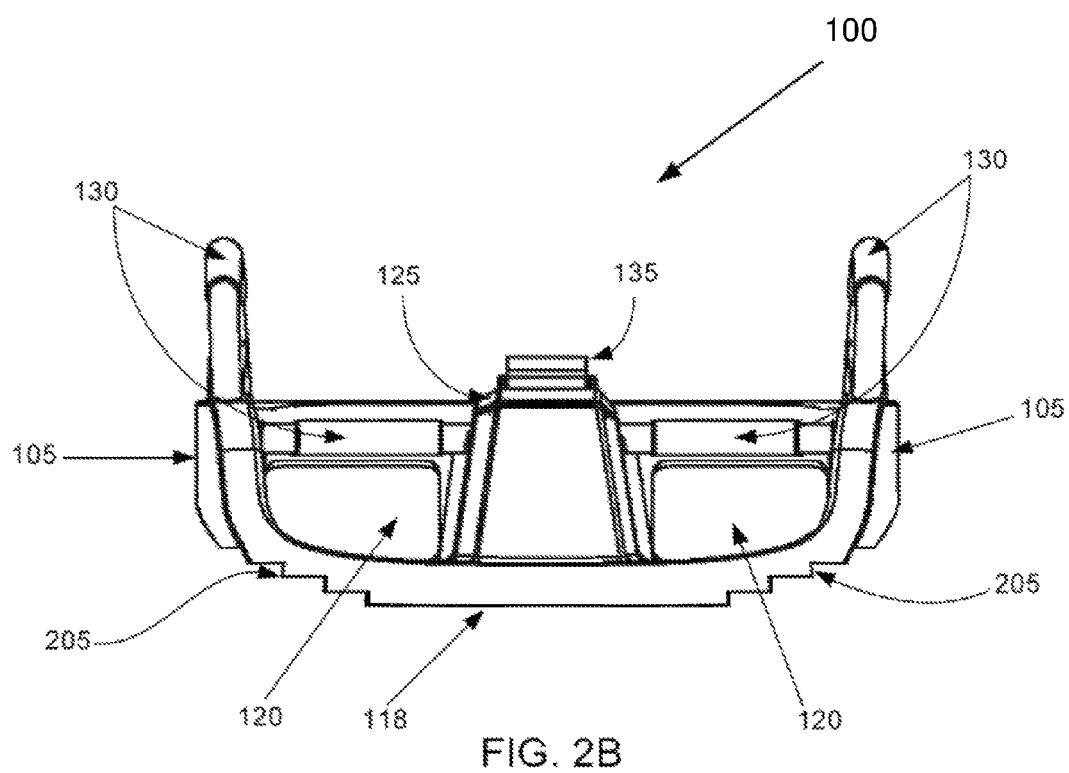
FIG. 2B is a device 100 having 5 edges per side.
Figure 2C:
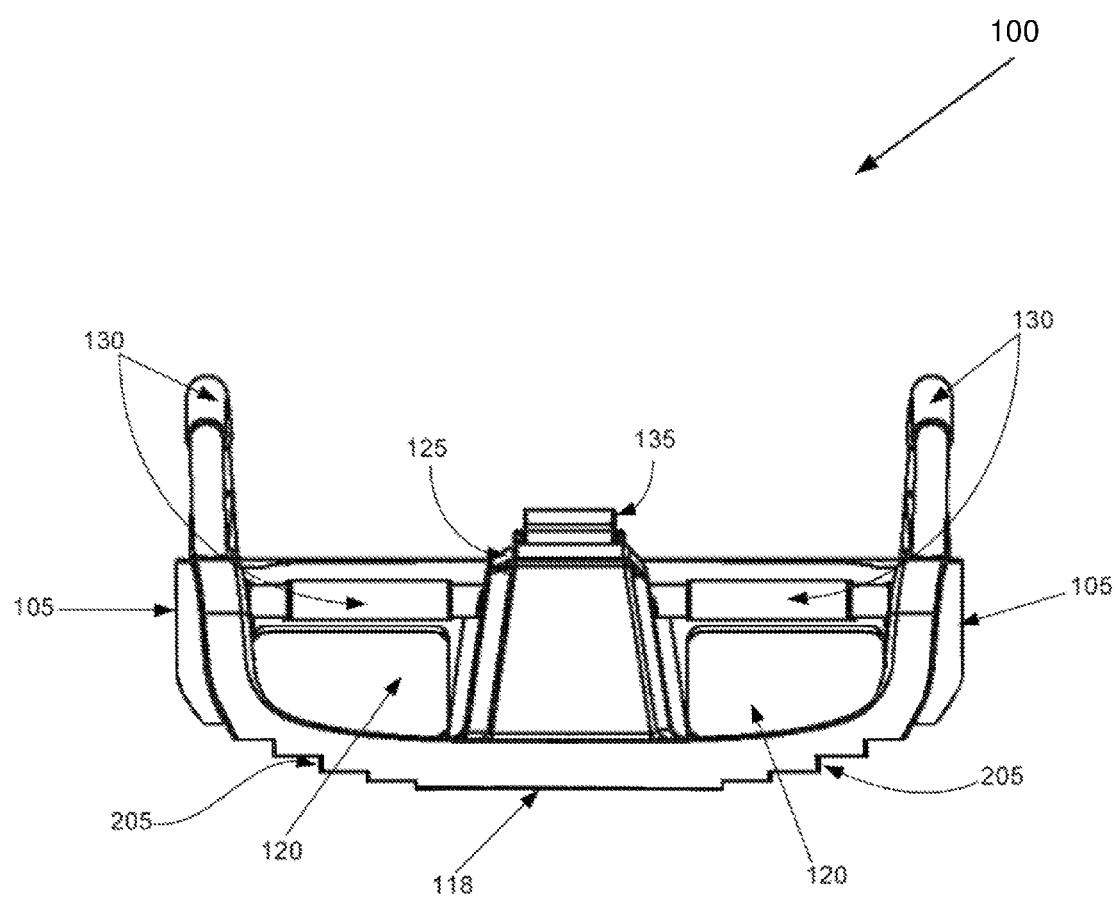
FIG. 2C is a device 100 having 6 edges per side, in accordance with an embodiment of the present invention.

FIG. 2 is an illustration of a cross-section view of an exemplary device 100 having variable amount of edges, in which FIG. 2A is a device 100 having 4 edges per side, FIG. 2B is a device 100 having 5 edges per side, and FIG. 2C is a device 100 having 6 edges per side, in accordance with an embodiment of the present invention. In some embodiments, a user may control and/or steer device 100 by leaning and/or pulling weight to one side or another. In the present embodiment, device 100 may have any number of edges per side 205. In a non-limiting example, device 100 may have between 1 and 10 edges per side 205. In some embodiments, edges 205 may be suitable for digging into a surface to create drag.

In some embodiments, device 100 may be composed of any suitable materials. In some embodiments, device 100 may be hollow. In a non-limiting example, device 100 may be filled with materials such as, but not limited to, wood, plastic, solid foam, fiberglass and/or epoxy. In another non-limiting example, device 100 may have a wood, plastic or solid foam core which may be sandwiched on top and/or bottom with layers of various materials, including, without limitation, low-friction plastic, epoxy, fiberglass, Kevlar, carbon fiber, rubber, and aluminum. In another non-limiting example, device 100 may be composed of a highly durable thermoplastic, including, without limitation, ultra-high-molecular-weight polyethylene or p-tex. In some embodiments, device 100 components may be heat-pressed to form a desired shape. In other embodiments, various molding techniques may be used to form a desired shape, including, without limitation, compression molding, injection molding, vacuum molding, rotational molding or blow molding. In some embodiments, device 100 exterior may be lined with various materials. In a non-limiting example, edges 205 may be lined with metal, such as, without limitation, steel or aluminum, or alternatively carbon fiber, to assist in carving turns. In the present non-limiting example, user may sharpen edges 205 to a precise angle. In some embodiments, device 100 may have a durable protective layer. In a non-limiting example, such protective layer may be composed of ultra-high-molecular-weight polyethylene or p-tex. In the present non-limiting example, the protective layer may be on the bottom portion 118 of device 100.

In some embodiments, body of device 100 may have one or more added layers to prevent warping. In a non-limiting example, suitable layers to prevent warping may include, without limitation, fiberglass sheets infused with epoxy. In some instances, device 100 may be tested for warping by exposing it briefly and/or repeatedly to a hand iron of up to approximately 150-220 degrees Celsius.

In at least one embodiment, device 100 may have added means of restraint. In a non-limiting example, device 100 may have a thigh or calf strap which may be suitable for securing a person sufficiently to allow user free use of one's hands while riding. In the present non-limiting example, user may have free use of hands to hold a rope which may be attached to a motor-powered vehicle to allow user to be pulled while on device 100. In some embodiments, device 100 may have a motor or other means of creating independent motion. In some alternative embodiments, device 100 may have one or more wheels to promote more efficient sliding ability on some surfaces. In a non-limiting example, wheels may protrude from bottom portion 118. In some of these alternative embodiments, device 100 may have pedals or other means of independently powering wheels.

In some embodiments, device 100 may have means for connecting device 100 to other objects. In a non-limiting example, multiple devices 100 may be linked together through use of hooks and/or receivers located on front portion 110 and back portion 115.

In at least one embodiment, device 100 may have one or more raised or lowered points on bottom portion 118. In some of these embodiments, points may include various permutations, including, without limitation, traditional camber, reverse camber/rocker, flat camber, camber combination, camber-rocker-camber, camber with lifted contact points, flat with lifted contact points, flat-rocker-flat, hybrid, banana, camrock, powder camber, etc.

In some embodiments, all or some of device 100 components may be removable.

In some alternative embodiments, device 100 may have a removable support bar which may extend from top of device 100. In some of these alternative embodiments, support bar may be suitable to support a user while standing. In a non-limiting example, a user may stand with feet on padded areas 120 and a support bar may extend perpendicularly from top surface of device 100 near front portion 110. In the present non-limiting example, user may travel while in a standing position using support bar to maintain balance. In some of these alternative embodiments, support bar may be extendable to adjust to a user's height.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC §112 (1), all claims must be supported by sufficient disclosure in the present patent specification, and any material known to those skilled in the art need not be explicitly disclosed. However, 35 USC §112 (6) requires that structures corresponding to functional limitations interpreted under 35 USC §112 (6) must be explicitly disclosed in the patent specification. Moreover, the USPTO's examination policy of initially treating and searching prior art under the broadest interpretation of a "mean for" claim limitation implies that the broadest initial search on 112(6) functional limitation would have to be conducted to support a legally valid examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC §112 (6) when such corresponding structures are not explicitly disclosed in the foregoing patent specification. Therefore, for any invention element(s)/structure(s) corresponding to functional claim limitation(s), in the below claims interpreted under 35 USC §112 (6), which is/are not explicitly disclosed in the foregoing patent specification, yet do exist in the patent and/or non-patent documents found during the course of USPTO searching, Applicant incorporates all such functionally corresponding structures and related enabling material herein by reference for the purpose of providing explicit structures that implement the functional means claimed. Applicant requests that fact finders during any claims construction proceedings and/or examination of patent allowability properly identify and incorporate only the portions of each of these documents discovered during the broadest interpretation search of 35 USC §112 (6) limitation, which exist in at least one of the patent and/or non-patent documents found during the course of normal USPTO searching and/or supplied to the USPTO during prosecution. Applicant also incorporates by reference the bibliographic citation information to identify all such documents comprising functionally corresponding structures and related enabling material as listed in any PTO Form-892 or likewise any information disclosure statements (IDS) entered into the present patent application by the USPTO or Applicant or any third parties. Applicant also reserves its right to later amend the present application to explicitly include citations to such documents and/or explicitly include the functionally corresponding structures which were incorporated by reference above.

Thus, for any invention element(s)/structure(s) corresponding to functional claim limitation(s), in the below claims, that are interpreted under 35 USC §112 (6), which is/are not explicitly disclosed in the foregoing patent specification, Applicant has explicitly prescribed which documents and material to include the otherwise missing disclosure, and has prescribed exactly which portions of such patent and/or non-patent documents should be incorporated by such reference for the purpose of satisfying the disclosure requirements of 35 USC §112 (6). Applicant notes that all the identified documents above which are incorporated by reference to satisfy 35 USC §112 (6) necessarily have a filing and/or publication date prior to that of the instant application, and thus are valid prior documents to incorporate by reference in the instant application.

Having fully described at least one embodiment of the present invention, other equivalent or alternative methods of implementing transport vehicles according to the present invention will be apparent to those skilled in the art. Various aspects of the invention have been described above by way of illustration, and the specific embodiments disclosed are not intended to limit the invention to the particular forms disclosed. The particular implementation of the transport vehicles may vary depending upon the particular context or application. By way of example, and not limitation, the transport vehicles described in the foregoing were principally directed to downhill travel implementations; however, similar techniques may instead be applied to the device having an independent power source, such as a motor, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   a device being configured to be operable for transporting a user across at least one of a snow, ice, mud and sand surface, said device comprising at least two side portions, a front portion, a back portion and a bottom portion being configured for engaging the surface to affect the transporting;
   a raised edge section, said raised edge section being configured for further engaging the surface to affect the transporting, wherein said raised edge section comprising at least four or more raised edge sections being configured to dig into said surface to create drag, and wherein said raised edge sections further comprising raised edge parts lined with carbon fiber being configured to assist in carving turns, in which said raised edge sections are configured to curve toward a proximate centerline of said device where a user controls and steers the device by leaning or pulling weight to one side or another;
   a pair of handles being joined to said device, each of said handles being positioned above a top portion of said device, along said side portions, and extending from said front portion to said back portion, said handles being configured to be operable for grasping by the user to control said engaging of said plurality of raised edges during the transporting;
   a strap mechanism, said strap mechanism comprising at least one strap being disposed to a proximate top center portion of said device, said strap mechanism being configured to receive at least a user's arm, said strap mechanism being further configured to be operable for at least grasping by the user for carrying said device;
   a bar structure, said bar structure comprising a raised bar disposed across a proximate midsection of said device top portion, said raised bar being configured to be operable for attaching to a tether to a user to prevent said device from sliding away from the user while in use;
   a seat segment, wherein said seat segment being joined to said top of said device, said seat segment being configured for receiving the user's buttocks and/or back with the user in a kneeling position; and
   a padded section, said padded section comprising at least two or more padded sections disposed to a proximate side region of said seat segment, said padded sections being configured to be operable for receiving at least a user's knees, shins, and/or insteps when a user is in a kneeling position.

2. The apparatus as recited in claim 1, said bar structure further comprising an attachment bar being joined to said top of said device, said attachment bar being configured for joining said device to another device.

3. The apparatus as recited in claim 1, said strap mechanism further comprising at least two strap mechanisms being joined to said proximate top center portion of said device.

4. The apparatus as recited in claim 3, in which at least one said strap mechanism is padded.

5. The apparatus as recited in claim 3, in which at least one said strap mechanism is expandable for placement of said device on the user's back.

6. The apparatus as recited in claim 5, further comprising an additional strap mechanism being joined to said proximate top center portion of said device.

7. The apparatus as recited in claim 1, in which said device further comprises a highly durable thermoplastic, including an ultra-high-molecular-weight polyethylene material.

8. The apparatus as recited in claim 1, in which said handles further comprise one or more hand grips on a proximate front portion of said handles.

9. The apparatus as recited in claim 1, in which said padded sections further comprise a varying thickness.

10. An apparatus comprising:
    means for transporting a user across a surface and for engaging the surface to affect the transporting;
    means for grasping by the user to control said engaging of the surface during the transporting;
    means for receiving at least a user's arm, said receiving means is disposed at a proximate midsection of said transporting means and being configured for at least grasping by the user for carrying said transporting means;
    means for preventing said transporting means from sliding away from the user while in use, wherein a tether is configured to attach said preventing means to the user;
    means for controlling and steering said transporting means;
    a seat segment, wherein said seat segment being joined to said top of said device, said seat segment being configured for receiving the user's buttocks and/or back with the user in a kneeling position; and
    a padded section, said padded section comprising at least two or more padded sections disposed to a side region of said seat segment, said padded sections being configured to be operable for receiving at least the user's knees, shins, and/or insteps when the user is in said kneeling position.

11. The apparatus as recited in claim 10, said preventing means further comprising means for joining said transporting means to another device.

12. The apparatus as recited in claim 10, further comprising means for grasping by the user for carrying said transporting means.

13. The apparatus as recited in claim 12, further comprising means for carrying said device.

14. An apparatus comprising:
    a device being configured for transporting a user across a surface, said device comprising a durable thermoplastic, including an ultra-high-molecular-weight polyethylene material, said device further comprising at least two side portions, a front portion, a back portion and a bottom portion, each of said side portions comprising a plurality of raised edges along lengths of bottoms of said side portions from said front portion to said back portion, said plurality of raised edges being lined with carbon fiber and curved towards a center line of said device, said plurality of raised edges being configured for engaging the surface to affect the transporting;
    a bar structure, said bar structure comprising a raised bar structure disposed across a proximate midsection of said top portion of said device, said raised bar structure being configured for attaching to a tether to a user to prevent said device from sliding away from the user while in use;

a strap mechanism, said strap mechanism comprising at least one strap mechanism being joined to said top portion of said device, said strap mechanism being padded and configured to receive at least a user's arm and for at least grasping by the user for carrying said device, at least one said strap mechanism further being expandable;

an additional strap mechanism being joined to said top portion of said device, said additional strap being padded, expandable, and positioned to use with said strap mechanism;

a pair of handles being joined to said device, each of said handles being positioned above a top portion of said device, along said side portions, and extending from said front portion to said back portion, wherein said handles comprise one or more hand grips on a front portion of said handles, said handles being configured for grasping by the user to control said engaging of said plurality of raised edges during the transporting;

a seat segment, wherein said seat segment being joined to said top of said device, said seat segment being configured for receiving the user's buttocks and/or back with the user in a kneeling position; and a padded section, said padded section comprising at least two or more padded sections disposed to a side region of said seat segment, said padded sections being configured to be operable for receiving at least the user's knees, shins, and/or insteps when the user is in said kneeling position.

* * * * *